United States Patent
Wade

[11] Patent Number: 5,818,464
[45] Date of Patent: Oct. 6, 1998

[54] METHOD AND APPARATUS FOR ARBITRATING ACCESS REQUESTS TO A SHARED COMPUTER SYSTEM MEMORY BY A GRAPHICS CONTROLLER AND MEMORY CONTROLLER

[75] Inventor: Nicholas D. Wade, Vancouver, Wash.

[73] Assignee: Intel Corporation, Santa Clara, Calif.

[21] Appl. No.: 960,113

[22] Filed: Oct. 27, 1997

Related U.S. Application Data

[63] Continuation of Ser. No. 516,495, Aug. 17, 1995, abandoned.

[51] Int. Cl.[6] .................................................. G06F 15/00
[52] U.S. Cl. .......................................... 345/501; 345/522
[58] Field of Search ................................... 345/501, 502, 345/504, 506, 514, 520, 522

[56] References Cited

U.S. PATENT DOCUMENTS

| | | | |
|---|---|---|---|
| 4,945,499 | 7/1990 | Asari et al. | 395/521 |
| 4,959,803 | 9/1990 | Kiyohara et al. | 395/119 |
| 5,088,024 | 2/1992 | Vernon et al. | 395/725 |
| 5,274,774 | 12/1993 | Manber et al. | 395/325 |
| 5,301,272 | 4/1994 | Atkins | 345/501 |
| 5,319,388 | 6/1994 | Mattison et al. | 395/501 |
| 5,335,322 | 8/1994 | Mattison | 395/501 |
| 5,450,542 | 9/1995 | Lehman et al. | 345/512 |
| 5,507,026 | 4/1996 | Fukushima et al. | 345/501 |
| 5,546,587 | 8/1996 | Silver | 395/730 |
| 5,553,248 | 9/1996 | Melo et al. | 395/296 |

*Primary Examiner*—Raymond J. Bayerl
*Assistant Examiner*—Cao H. Nguyen
*Attorney, Agent, or Firm*—Blakely, Sokoloff, Taylor & Zafman

[57] ABSTRACT

The shared computer system memory is partitioned between system memory and frame buffer memory. The memory controller and the graphics controller share access to the computer system memory through a single interface bus. An arbitration unit is provided to arbitrate competing usage requests to the memory from the memory controller and the graphics controller. The arbitration unit may form a portion of the memory controller or may be configured as a stand alone unit. In either case, the arbitration unit resolves competing usage requests by applying a prioritization protocol. The arbitration unit grants control of the memory to either the memory controller or the graphics controller depending upon which has asserted a higher priority request. Once the graphics controller has been granted control of the memory, the arbitration unit cannot revoke control from the graphics controller. Rather, the arbitration unit requests that the graphics controller relinquish control. In one embodiment, communication between the arbitration unit and the graphics controller utilizes only two signal lines, a request line and a grant line. A two-wire protocol is disclosed which allows the graphics controller to assert two different levels of priority requests using the single request line. Method and apparatus embodiments of the invention are disclosed.

27 Claims, 12 Drawing Sheets

METHOD AND APPARATUS FOR ARBITRATING ACCESS REQUESTS TO A SHARED COMPUTER SYSTEM MEMORY BY A GRAPHICS CONTROLLER AND MEMORY CONTROLLER

This is a continuation of application Ser. No. 08/516,495, filed Aug. 17, 1995, now abandoned.

BACKGROUND OF THE INVENTION

1. Field of the Invention

The invention generally relates to computer systems and, in particular, to computer systems employing a memory controller and a graphics controller.

2. Description of Related Art

Typical computer systems employing a microprocessor utilize a memory controller and a graphics controller. The memory controller controls access by the microprocessor to system memory. The graphics controller controls display of data provided by the microprocessor onto a display screen using a frame buffer. Both the system memory and the frame buffer are typically implemented using arrays of dynamic random access memory (DRAM) chips. In such systems, the memory controller cannot directly access the frame buffer and the graphics controller cannot directly access the system memory.

Certain disadvantages arise from providing a frame buffer which is separate from system memory. For example, if all or a portion of a frame buffer is not in use, it would be desirable to allow unused portions of the frame buffer memory to be employed as system memory. Such cannot easily be achieved with a separate frame buffer controlled by a graphics controller.

Technically, the present application is related to U.S. patent application Ser. No. 08/515,672, entitled Method and Apparatus For Managing Access to a Shared Computer System Memory by a "Graphics Controller and a Memory Controller", filed contemporaneously herewith, which is incorporated herein by reference.

One proposed solution to the foregoing problem is to provide a single array of DRAM memory chips accessible to a single interface bus by both the memory controller and the graphics controller. The memory space provided by the single array is partitioned between system memory and frame buffer memory. In such a system, the memory controller has access to all of the shared memory including that portion used as a frame buffer. Accordingly, if a frame buffer is not required, the memory controller may access the frame buffer portion of memory for use as system memory. Also, certain graphics operations may be expedited by allowing both the graphics controller and the memory controller to write graphics data into the frame buffer. For example, a set of individual graphics operations may be pipelined with some operations performed through the graphics controller and others through the memory controller in rapid succession. Another advantage of such a system is that the size of the portion of memory devoted to the frame buffer may be easily modified based upon the needs of the system.

Hence, in such a system, both the memory controller and the graphics controller can access the same array of physical memory through a single interface bus. An arbitration mechanism must be employed to prevent conflicts between the memory controller and the graphics controller. For example, the memory controller may need to perform a DRAM refresh of the memory while the graphics controller may need to simultaneously access the frame buffer portion of memory to store graphics data generated by a drawing engine. Other memory operations which may need to be performed by the memory controller include system memory access commands, such as reads and writes, received either directly from a CPU or from peripheral components through a PCI bus. Other graphics commands which may be need to be performed simultaneously by the graphics controller include screen refresh operations. Such screen operations must be performed immediately if a screen refresh FIFO of the graphics controller is starved.

Accordingly, there is a need to provide a method and apparatus for arbitrating memory usage requests by the memory controller and the graphics controller. There is also a need to provide a prioritization protocol to allow competing usage requests to be prioritized during arbitration. Aspects of the present invention are drawn to an arbitration method and apparatus and to a prioritization protocol.

In implementing an arbitration apparatus, it is particularly desirable to utilize the fewest number of arbitration signal transmission lines between the graphics controller and the arbitration apparatus to minimize cost and complexity. In particular, it would be desirable to provide a two-wire arbitration protocol to allow the graphics controller to communicate with the arbitration apparatus using only two signal lines. The use of only two lines is particularly problematic, however, if the graphics controller has more than one priority level of graphics commands, namely, high priority screen refresh commands necessary when the screen refresh FIFO is starved and lower priority commands such as drawing commands or screen refresh commands when the screen refresh FIFO is not starved. Accordingly, other aspects of the invention are drawn to providing an arbitration apparatus utilizing a minimum number of arbitration signal transmission lines, preferably only two, between the graphics controller and the arbitration apparatus.

SUMMARY OF THE INVENTION

In accordance with one aspect of the invention, a prioritization protocol is provided for use in arbitrating usage requests from a memory controller and from a graphics controller for a shared physical memory accessible both as system memory and as a frame buffer through a single memory interface bus. The prioritization protocol grants a highest priority to a graphics controller request specifying a screen refresh when a screen refresh FIFO is starved. The protocol grants a second highest priority to a memory controller request specifying a high priority DRAM memory refresh. A third highest priority is granted to a memory controller request specifying a memory access request, such as received from a CPU or a PCI bus. A fourth highest priority is granted to a graphics controller request specifying a graphics operation other than a screen refresh operation when a screen refresh FIFO is starved. A fifth highest priority is granted to a low priority DRAM refresh operation. The prioritization protocol also designates the memory controller as the default owner of the physical memory.

By employing the foregoing prioritization protocol, arbitration between the memory controller and the graphics controller is performed while ensuring that critical operations, such as screen refresh operations, are performed prior to lower priority operations.

In an exemplary embodiment, an arbitration unit is provided which receives usage request from the memory controller and the graphics controller and grants access to the memory based upon the prioritization protocol set forth above. By granting access to the memory, it is meant that the arbitration unit grants control over the single memory interface bus. The arbitration unit may be separate from both the memory controller and the graphics controller. Alternatively, the arbitration unit forms a portion of the memory controller.

Once access to the memory is granted to the graphics controller, the arbitration unit does not unilaterally withdraw access. Rather, the arbitration unit transmits a signal to the graphics controller requesting the graphics controller to relinquish control of the memory. Depending upon the priority of the operation being performed by the graphics controller, the graphics controller either relinquishes control of the memory immediately or completes its operation then relinquishes control. To ensure that high priority DRAM refresh operations are performed in a timely manner, the graphics controller is configured to always relinquish control of the memory within a predetermined number of clock cycles, even when performing a high priority screen refresh operation.

In the exemplary embodiment, transmission of arbitration signals between the graphics controller and the arbitration unit employ only two signal lines, a request line and a grant line. To request access to the memory for a low priority graphics operation, the graphics controller continuously asserts a request signal on the request line until the arbitration unit asserts a grant signal on the grant line. To request access to the memory based upon a high priority operation, the graphics controller asserts a request signal, then deasserts the request signal before receiving a return grant signal. The graphics controller immediately reasserts the request signal on the next clock cycle after deassertion. In this manner, the arbitration unit receives a one clock cycle pulse indicating the need to perform a high priority operation. The one clock cycle pulse may be transmitted at any time after the request signal is initially asserted, but before a grant signal is returned. Hence, the graphics controller may initially request a low priority operation by merely asserting the request line, then upgrade the request to a high priority request by transmitting the pulse. In this manner, two separate priority levels of request signals may be transmitted over a single request line. If the memory controller is configured to perform arbitration functions, then the two signal lines are connected directly between the graphics controller and the memory controller.

After access is granted, the graphics controller continues to assert the request line until it has completed its operation. At that time, the graphics controller relinquishes control of the memory by deasserting the request signal. Also, the arbitration unit continues to assert to the grant signal while the graphics controller has control, until the arbitration unit detects the deassertion of the request line indicating that the graphics controller has relinquished control of the memory.

Also in the exemplary embodiment, to request the graphics controller to relinquish control of the system memory, the arbitration unit deasserts a grant signal on the grant line. The graphics controller, upon detection of the deasserted grant signal, may relinquish control of device by subsequently deasserting the request signal. The arbitration unit, upon detecting deassertion of the request signal, grants access to the memory controller.

Hence, the exemplary embodiment employs a two-wire arbitration protocol wherein multiple levels of priority usage requests may be communicated. However, the two-wire arbitration protocol of the invention need not be employed only within the arbitration system employing the prioritization scheme set forth above. Rather, the two-wire arbitration protocol may be employed in other systems as well. Also, the arbitration system of the invention need not employ the two-wire communication protocol.

DETAILED DESCRIPTION OF EXEMPLARY EMBODIMENTS OF THE INVENTION

Referring to figures, exemplary embodiments of the invention will now be described. The exemplary embodiments are provided to illustrate aspects of the invention and should not be construed as limiting the scope of the invention. The exemplary embodiments are primarily described with reference to block diagrams, flowcharts and timing diagrams. As to the flowcharts, each block within the flowcharts represents both a method step and an apparatus element for, unit for or means for performing the method step. Depending upon the implementation, the corresponding apparatus element may be configured in hardware, software, firmware or combinations thereof.

Figure 1:
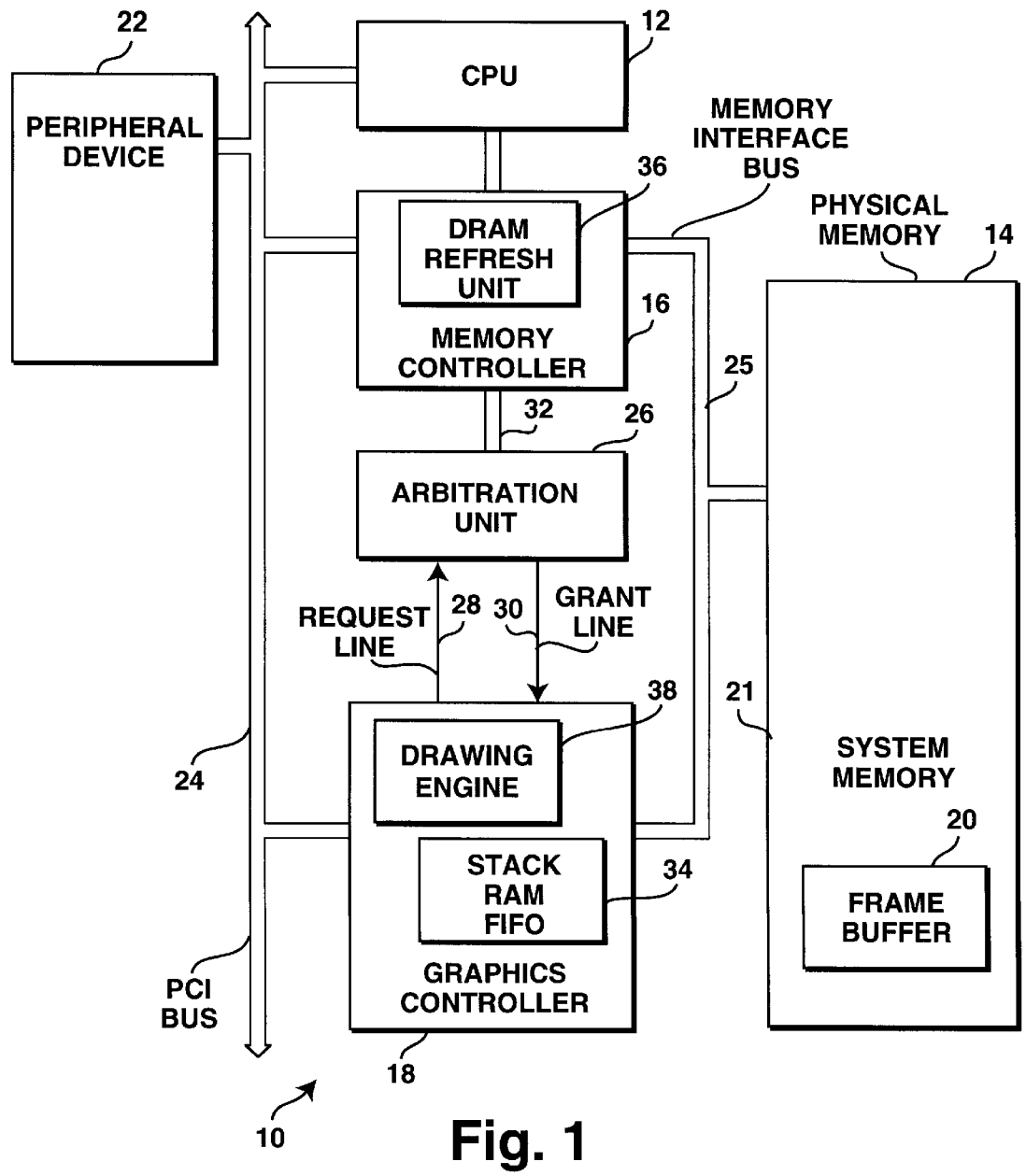
FIG. 1 is a block diagram illustrating a computer system configured in accordance with the invention and having a shared physical memory partitioned between system memory and frame buffer memory.

FIG. 1 illustrates a computer system 10 having, as its principal complements, a CPU 12, a shared physical memory 14, a memory controller 16 and a graphics controller 18. A portion memory 14 is dedicated as a frame buffer 20. Remaining portions of memory 14 are dedicated as system memory 21. The memory controller accesses memory 14 based upon commands received from the CPU 12 and from one or more peripheral devices, such as peripheral device 22 connected to the memory controller through a PCI bus 24. For example, the memory controller may read data from, and write data to, memory 14. For some operations, such as a DRAM refresh, the memory controller requires access to all portions of memory 14. For other operations, the memory controller accesses only the system memory portion of shared memory 14. For still other operations, the memory controller accesses the frame buffer portion of shared memory 14. The above-referenced patent application provides details regarding a method and apparatus for managing access to the shared computer system memory through the memory controller and the graphics controller and such will not be described in detail herein.

The graphics controller accesses the frame buffer portion of system memory 14 to store graphics data therein for ultimate display on a graphics display (not shown). Graphics data, or commands relevant thereto, are received through the PCI bus. The graphics commands may originate from, for example, the CPU or from other "clients" on the PCI bus. Both the memory controller and the graphics controller access memory 14 through a single memory bus 25.

Hence, computer system 10 includes a memory accessible by both a memory controller and a graphics controller. An arbitration unit 26 is provided for coordinating access to the memory by the memory controller and the graphics controller. More specifically, the arbitration unit receives usage requests from both the memory controller and the graphics controller and determines the relative priority of the usage requests, then grants access to one device or the other depending upon the relative priorities. In FIG. 1, the arbitration unit is shown as a separate component from the memory controller and the graphics controller. However, depending upon the implementation, the arbitration unit may form a portion of the memory controller. In other words, the memory controller may include circuitry for performing the arbitration functions. In such an embodiment, the graphics controller is connected directly to the memory controller. For clarity in describing the invention, the arbitration unit is shown as a separate component.

Arbitration unit 26 is connected to graphics controller 18 by two wires or lines: a request line 28 and a grant line 30. The arbitration unit receives usage request information along the request line and transmits grant information along the grant line in accordance with a two-wire signaling protocol to be described in detail below. The arbitration unit also receives signals from, and transmit signals to, the memory controller along a transmission path generally denoted by bus line 32. The method which the signals are transmitted between the arbitration unit and the memory controller is not pertinent to the present invention and will not be described in further detail herein.

As noted, the arbitration unit receives memory system usage requests from the memory controller and the graphics controller. The arbitration unit prioritizes usage requests as follows, with number (1) being highest priority:

1. High priority graphics controller request specifying a screen refresh operation when a screen refresh FIFO 34 is starved.
2. A high priority memory controller request specifying a DRAM refresh operation to be performed by a DRAM refresh unit 36.
3. Memory controller request specifying non-DRAM refresh operations, such as CPU and PCI memory operation requests.
4. Low priority graphics controller request specifying any graphics controller operation other than a screen refresh when the refresh FIFO is starved. Examples include a draw operation performed by a draw engine 38 or a screen refresh operation when the screen refresh FIFO is not starved.
5. A low priority memory controller operations specifying a low priority DRAM refresh operation.

The default owner of the memory is the memory controller.

The arbitration unit grants access to the system memory based upon the relative priority of competing requests received from the memory controller and the graphics controller. By granting access to the memory, it is meant that the arbitration unit grants control over the single interface bus. If a high priority graphics controller request and a high priority memory controller request are received simultaneously, the arbitration unit grants control of the memory to the graphics controller. If the memory controller has already been granted control of the memory, and a higher priority graphics controller request is received, the arbitration unit revokes control previously granted to the memory controller, and grants control to the graphics controller. In contrast, however, if the graphics controller has control of the memory, and a high priority memory controller request is received, the arbitration unit does not revoke control. Rather, the arbitration unit transmits a signal to the graphics controller requesting that the graphics controller relinquish control. The foregoing also occurs while a high priority graphics control operation is being performed if a high priority DRAM refresh request is received, even though the high priority graphics controller operation has priority over the high priority DRAM refresh operation. To guarantee DRAM refresh, the graphics controller relinquishes control of the system memory within a predetermined number of clock cycles.

Thus, the arbitration unit receives three levels of request signals from the memory controller (corresponding to overall priority levels 2, 3 and 5 above) and receives two levels of priority request from the graphics controller (corresponding to overall priority levels 1 and 4 above). Request signals and responsive grant signals are transmitted between the memory controller and the arbitration unit in accordance with conventional techniques. The two levels of graphics controller request signals and responsive grant signals, are transmitted using lines 28 and 30 employing the two-wire arbitration protocol to be described below.

Figure 2:
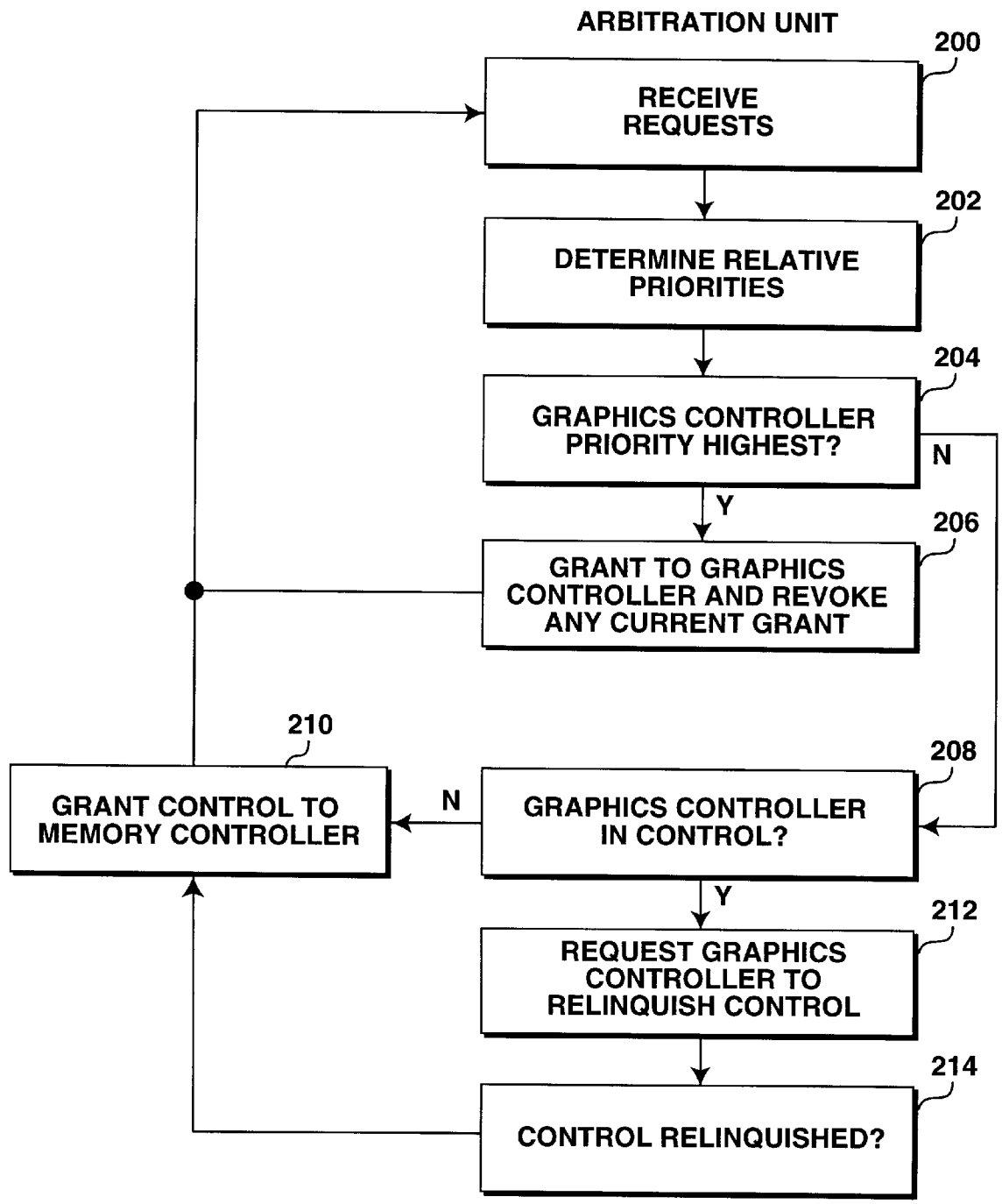
FIG. 2 is a flowchart illustrating a method for arbitrating usage requests between the memory controller and the graphics controller within the system of FIG. 1.

The operation of the arbitration unit is summarized in FIG. 2. Initially, the arbitration unit receives usage requests from either the memory controller or the graphics controller, step 200, and determines the relative priority, step 202. If the priority of the graphics controller request is greater than that of the memory controller request, as determined at step 204, the arbitration unit grants control to the graphics controller and revokes any previous grant to the memory controller, step 206. Execution returns to step 200 where the arbitration unit receives further requests.

If, at step 204, the graphics controller request has a lower priority than a competing memory controller request, then execution proceeds to step 208 where the arbitration unit determines whether the graphics controller is currently in control. In this regard, the arbitration unit may examine an internal state machine (not shown) which maintains the status information as to whether the graphics controller or the memory controller has control and what level of priority is associated therewith. If the graphics controller is not currently in control, then control is granted to the memory controller, step 210, and execution again returns to step 200. If, at step 208, the graphics controller is determined to be in control, then the arbitration unit transmits a signal to the graphics controller requesting the graphics controller to relinquish control of the memory system, step 212. The arbitration unit then waits until the graphics controller relinquishes control, step 214, then grants control to the memory controller, step 210. The graphics controller is configured to relinquish control almost immediately if it is performing a low priority operation. If the graphics controller is performing a high priority operation then it is configured to complete the operation prior to relinquishing control. As noted, the graphics controller is configured to relinquish control within a predetermined number of clock cycles even when performing a high priority operation, to ensure that DRAM refresh occurs.

Figure 3:
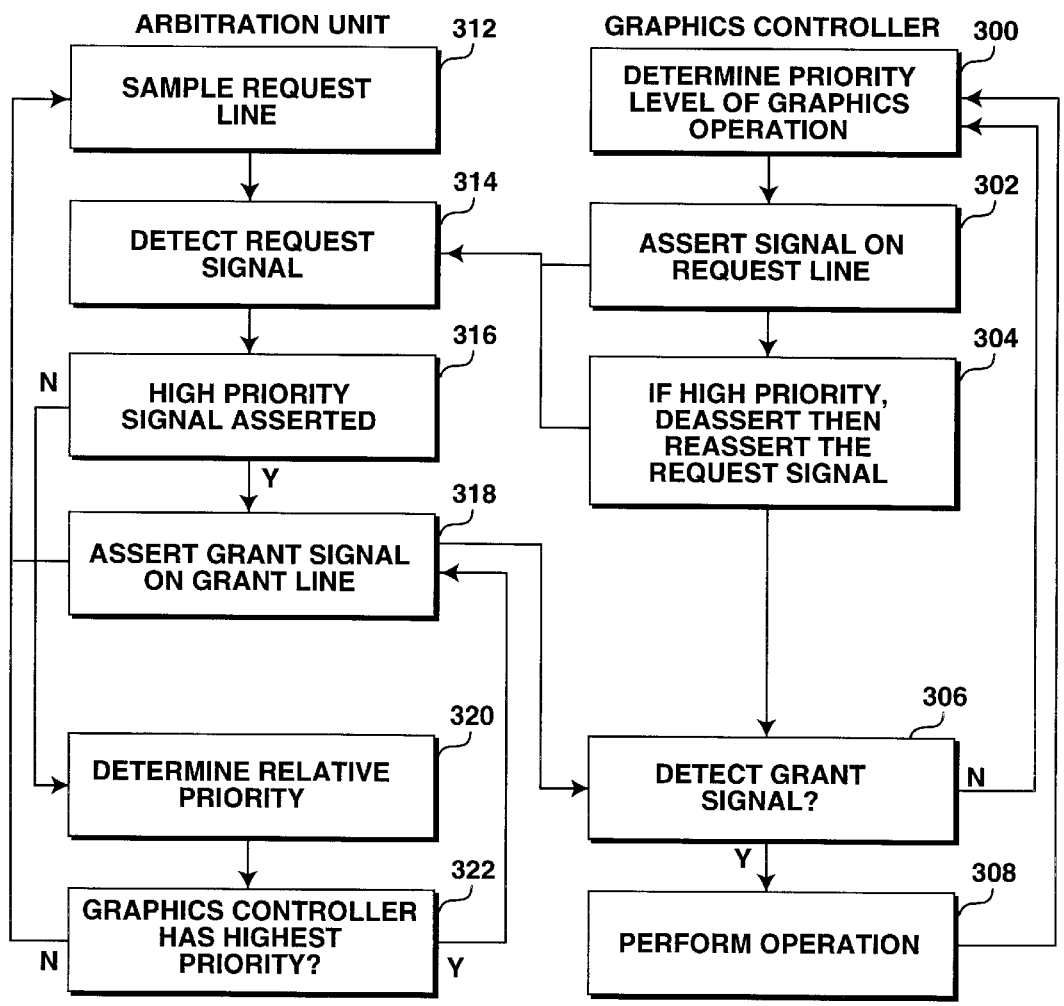
FIG. 3 is a block diagram illustrating a method by which the graphics controller of FIG. 1 transmits access requests of differing priorities to the arbitration unit.
Figure 4:
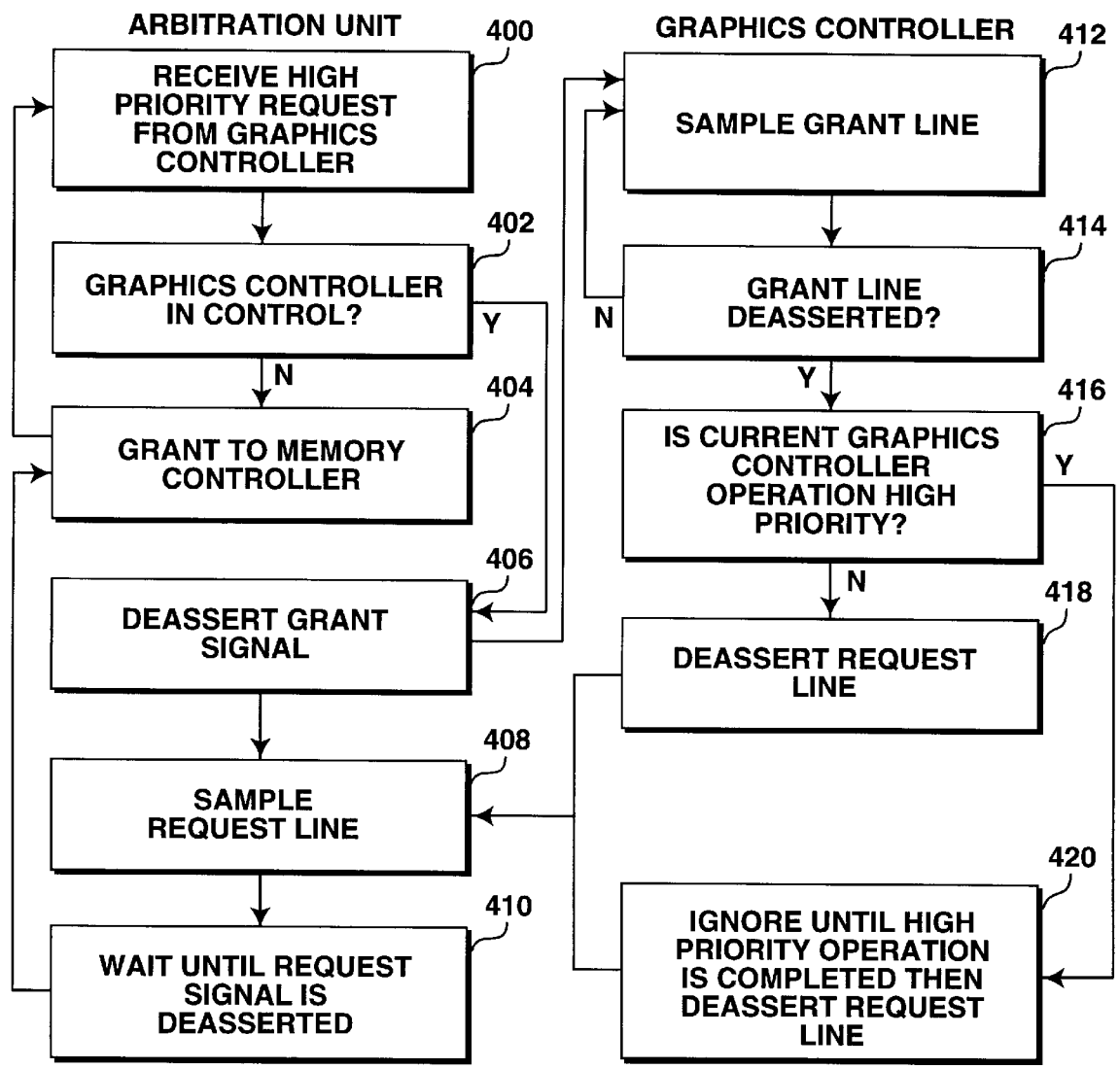
FIG. 4 is a flowchart illustrating a method by which the arbitration unit of FIG. 1 requests the graphics controller to relinquish control of the memory.

Thus, FIG. 2 provides an overview of the steps performed by the arbitration unit to arbitrate between competing usage requests received from the memory controller and graphics controller. FIGS. 3 and 4 set forth specific steps performed by the arbitration unit and graphics controller for transmitting usage request and grant signals using a two-wire protocol. Briefly, the graphics controller transmits two levels of request signals using single request line 28 as follows. The graphics controller asserts a low priority request by continuously asserting a request signal on the request line until a grant signal generated by the arbitration unit is detected on grant line 30. The graphics controller asserts a high priority signal by asserting the request signal, then deasserting the request signal before a return grant signal is detected. The request signal is deasserted for only a single clock cycle, then reasserted. In either case, after the grant signal is received, the graphics controller continues to assert the request signal until it is ready relinquish control of the memory upon completion of an operation. Also, if no grant signal is initially detected, the graphics controller continues to assert the request signal until a grant signal is detected. At any time prior to receipt of a grant signal, the graphics controller can increase the priority of its request, by deasserting then reasserting the request line in the manner just described. In the exemplary embodiment, assertion of a signal on either the request line or the grant line is performed by pulling down the voltage on the line from a high level to a low level. In other words, the request line and the grant line are both active low lines. Deassertion of a signal is achieved by pulling up the voltage from a low level to a high level. Depending upon how the signal lines are biased, deassertion may be achieved merely by releasing the signal line.

The foregoing basic steps are set forth in FIGS. 3 and 4. FIG. 3 illustrates the steps performed by the graphics controller and the arbitration unit wherein the graphics controller requests access and the arbitration unit grants access. Initially, step 300, the graphics controller determines the priority of an operation to be performed. The priority is high if the operation is a high priority screen refresh operation when the screen refresh FIFO is starved. All other operations are low priority operations. Regardless of the priority, the graphics controller asserts a request signal by pulling down the request line, step 302. If the operation is high priority, the graphics controller promptly deasserts the signal by pulling up the request line, then reasserts the signal one clock cycle later, step 204. The graphics controller continues to pull the request line low until detecting a grant signal on the grant line, step 306. Upon detection of the grant signal, the graphics controller then performs the requisite operation, step 308, then relinquishes control of the memory by pulling up the request line. Execution returns to step 300 in which graphics controller determines the priority of its next required operation. If, at step 306, a grant signal is not detected, execution returns to step 300 where the graphics controller can reevaluate the priority of the graphics operation and, perhaps, upgrade the priority to high priority.

The arbitration unit performs the following steps. Initially, at step 312, the arbitration unit samples the request line. The request signal asserted at step 302 is detected by the arbitration unit at step 314. The arbitration unit then determines whether the request is a low priority request or a high priority request by detecting whether the signal on the request line is deasserted then reasserted, step 314. If the signal is not deasserted, then the request is low priority. If the signal is deasserted, then reasserted, the request is high priority. If the request is determined to be high priority, step 316, then the arbitration unit immediately grants control to the graphics controller by asserting a grant signal on the grant line and by revoking any previous grant to the memory controller, step 318. The grant signal is asserted by pulling the voltage of the grant line low. Execution then returns to step 312 where the arbitration unit continues to sample the request line to determine when the graphics controller relinquishes control of the memory system.

If, at step 316, the request is determined to be a low priority request, then the arbitration unit determines the relative priority of the graphics controller lower priority request and any competing request for current usage, step 320. Next, the arbitration unit determines whether the graphics controller has priority over a current memory controller operation or competing request, step 320. If the graphics controller has priority, execution proceeds to step 318 where the arbitration unit asserts the grant signal. If the graphics controller does not have higher priority, no grant signal is asserted, and execution instead returns to step 312 where the arbitration unit continues to sample the request line. As noted above, the graphics controller may upgrade the priority of its request at any time prior to receipt of a grant signal. Accordingly, even though the arbitration unit does not grant access to the graphics controller because the graphics controller has lower priority, such may change and the arbitration unit may respond accordingly. Also, even while the graphics controller has lower priority, eventually the competing operation of the memory controller will be completed and, assuming there is not further conflict, control is then granted to the graphics controller.

As noted, circumstances arise where the arbitration unit must request the graphics controller to relinquish control of the memory system. This is illustrated in FIG. 4. The steps of FIG. 4 assume that the graphics controller already has control of the memory system and is continuously pulling the request line low. Initially, at step 400, the arbitration unit receives a high priority request from the memory controller. The memory controller then determines whether the graphics controller already has control, perhaps by examining internal state variables, step 402. If the graphics controller does not currently have control, then control is granted to the memory controller, step 404 and execution returns to step 400. If, however, the graphics controller does have control, then the arbitration unit transmits a signal to the graphics controller requesting that it relinquish control, step 406. This is performed by pulling up the voltage on the grant line which is otherwise held low at all times while the graphics controller has control, step 406. The memory controller then samples the request line at each clock cycle, step 408, to determine when the graphics controller actually relinquishes control. Once control has been relinquished, step 410, execution proceeds to step 404 where the memory controller is granted control.

Meanwhile, the graphics controller, which initially has control, samples the grant signal at each clock cycle, step 412. If the grant signal is not deasserted, as determined at step 414, execution returns to step 412. If the grant signal is deasserted, the graphics controller then evaluates its own priority, step 416. If the graphics controller priority is low, the graphics controller terminates its current operation and deasserts the signal on the request line, step 418. If the graphics controller operation is high priority, the graphics controller completes its operation, then deasserts the signal, step 420. As noted above, the graphics controller should be configured to complete its high priority operation and deassert the request line within a predetermined number of clock cycles to assure that DRAM refresh can occur.

Specific Exemplary System

Figure 5:
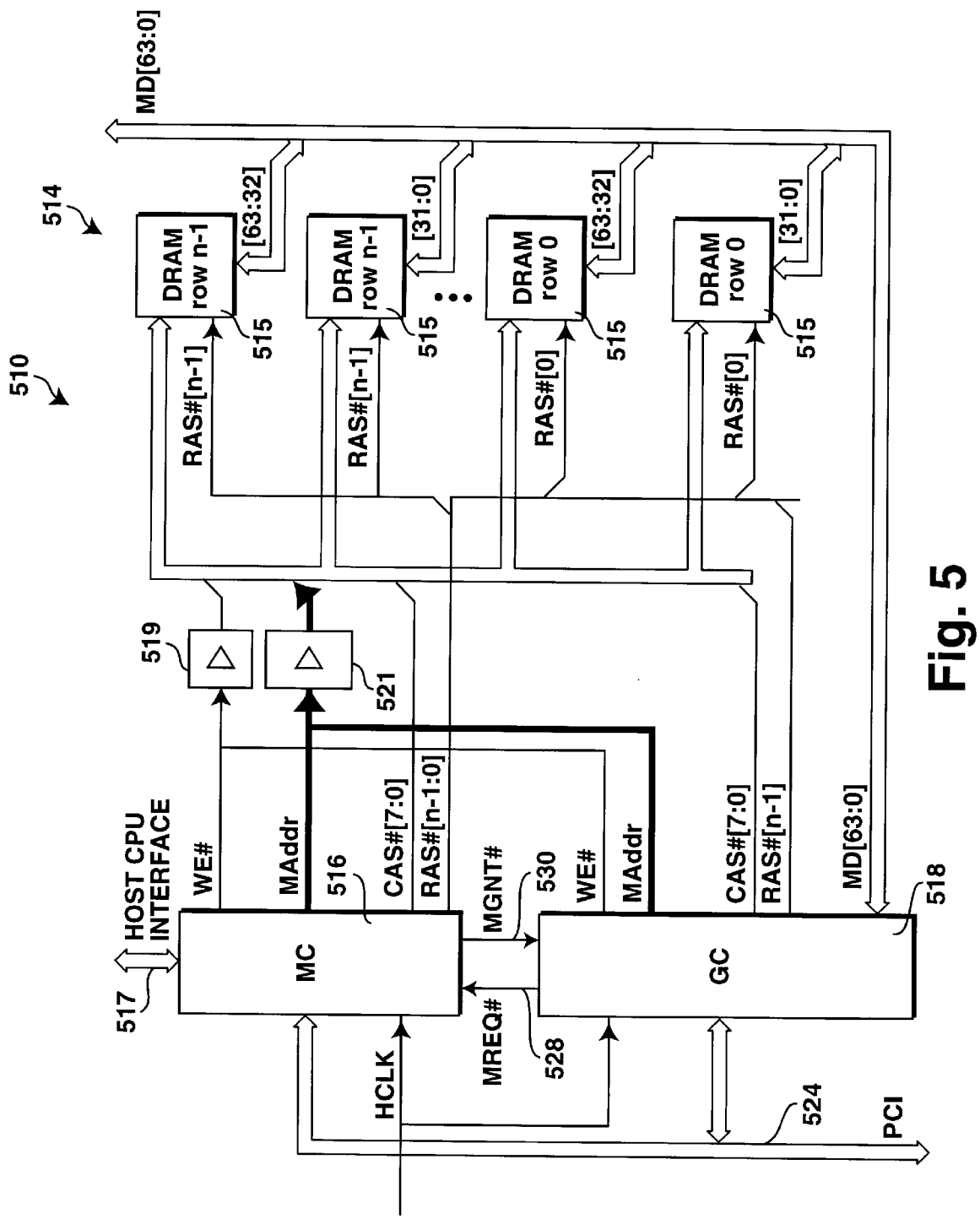
FIG. 5 is a block diagram illustrating a specific exemplary embodiment of the memory controller, graphics controller and system memory of FIG. 1.

With reference to the remaining figures, a specific exemplary system incorporating principles of the invention will be described in detail. FIG. 5 illustrates a computer system 510 having an memory controller 516 and a graphics controller 518. Both are configured to access a shared physical memory array 514 configured with individual DRAM units generally denoted 515. Memory controller 516 interfaces with a CPU (not shown) via a host CPU interface 517. Graphics controller 518 interfaces with various peripheral components (not shown) via a PCI bus 524. A portion of memory 514 is employed as a frame buffer (not separately shown).

Thus far, the system of FIG. 5 is similar to that of FIG. 1. However, whereas the system of FIG. 1 provides an arbitration unit separate from both the memory controller and graphics controller, in the system of FIG. 5, arbitration functions are performed by memory controller 516. Graphics controller 518 is directly connected to memory controller 516 by an MREQ# request line 528 and MGNT# request line 530. Many other transmission lines and bus lines are shown interconnecting the various components. Examples include write enable lines, memory address lines, column address strobe lines, row address strobe lines, etc. These lines and buses transmit signals well-known to those skilled in the art and will not be further described. In FIG. 5, conventional abbreviations for such signal lines are employed.

Many of the signals are implementation specific to certain memory types. Principles of the invention, however, may be applied to other systems employing other memory types where the specific signals illustrated in FIG. 5 need not necessarily be employed. Also, system 510 employs external buffers 519 and 521 on the write enable and memory address lines, respectively. These are also not required. However, if such external buffers are not present, both the memory controller and graphics controller must be capable of driving the full population of DRAMs, preferably using output buffers with equivalent drive characteristics. The lower two memory address signals, MA[1:0] may be physically duplicated for loading reasons. One copy MA_[1:0] interfaces the upper row (n−1) of memory is used by both graphics controller and memory controller to access SIMMs with shared memory. An MA_B[1:0] copy interface to the remaining lower rows and is driven by the MCL. The graphics controller of FIG. 5 is shown as having access to the top row of memory only. Such need not be the case. Also, note that a single clock signal HCLK is employed by both the memory controller and graphics controller to ensure correct operation of the synchronous memory arbitration protocol.

The graphics controller and memory controller communicate using the request and grant lines in the manner outlined above to coordinate access to the DRAMs through buffers 519 and 521. In other words, at any given clock cycle, either the memory controller, graphics controller, but not both, can drive signals to the DRAMs through the external buffers along the write enable and memory address lines.

Exemplary signals employed by the system of FIG. 5 will now be described with reference to timing diagrams as set forth in FIGS. 6–12.

Figure 6:
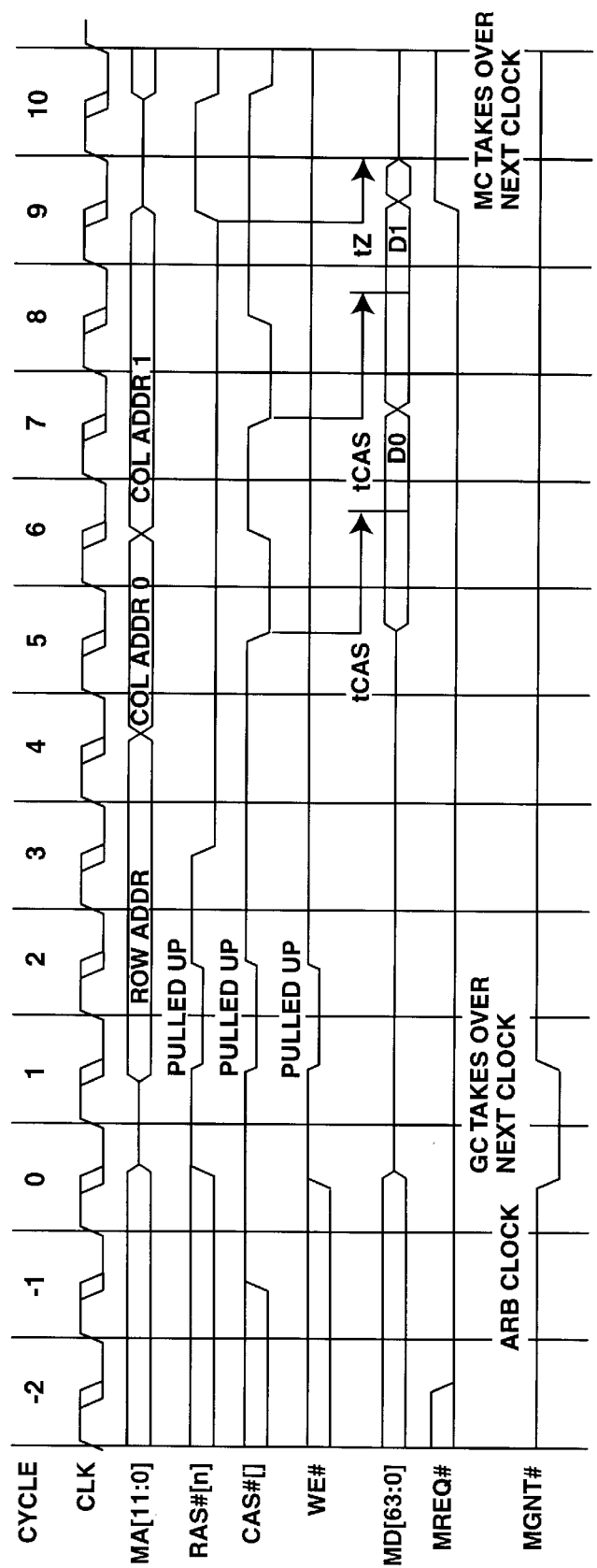
FIG. 6 is a timing diagram illustrating a method by which the graphics controller is granted access to the memory for the embodiment of FIG. 5, wherein the graphics controller operates synchronously with an arbitration clock.
Figure 7:
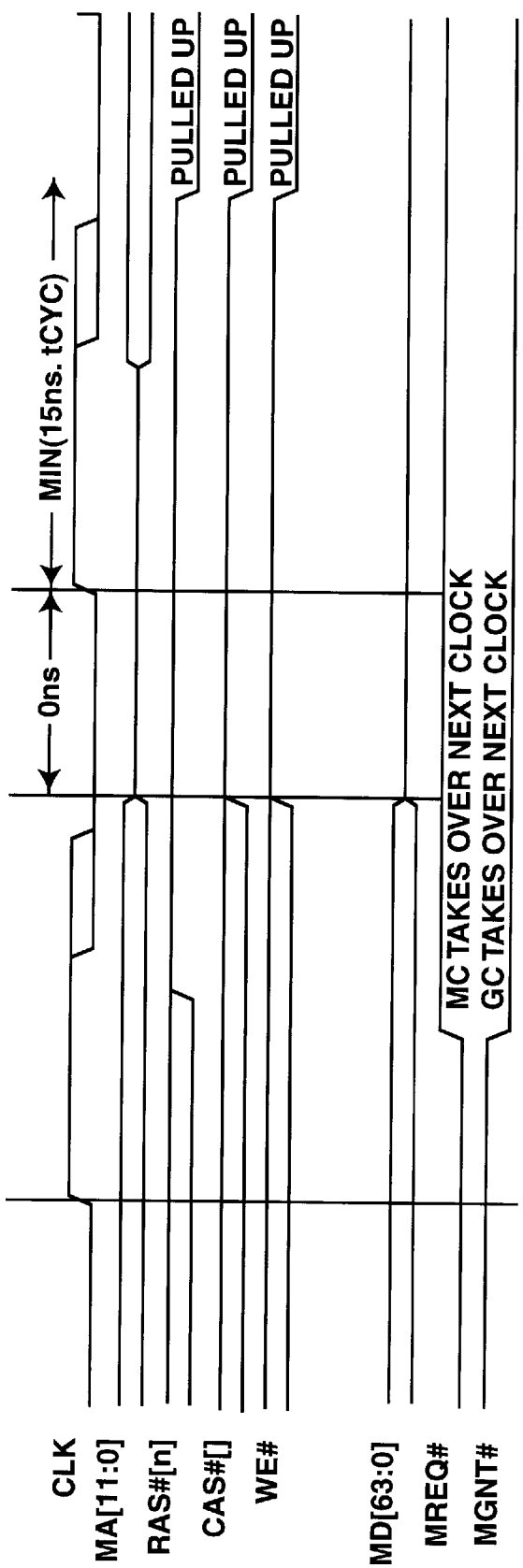
FIG. 7 is a timing diagram similar to FIG. 6 but for a system wherein the graphics controller operates asynchronously with respect to the arbitration clock.

FIG. 6 illustrates the transference of the ownership of DRAM address and control signals between the memory controller and graphics controller based upon arbitration signals transmitted on the request and grant lines. Within FIGS. 6–12, individual signals are labeled in accordance with the corresponding signal line illustrated in FIG. 5. The timing diagrams will be described primarily with reference to signals asserted on the request and grant lines. Signals asserted on the remaining lines are illustrated in the figures for the sake of completeness. These signals may be provided in accordance with otherwise conventional systems.

In FIG. 6, the graphics controller transmits a low priority request by asserting MREQ# in clock period -2. During the next clock period, the memory controller executes arbitration logic to determine whether the graphics controller should be granted control of the memory. In this case, graphics controller is granted control and the memory controller asserts MGNT# in clock cycle 0 to notify the graphics controller. The graphics controller takes over control of all other signal lines in clock cycle 1. The memory controller also deasserts MGNT# in clock cycle 1.

Note that all CAS# signals must be deasserted at the end of clock cycle-1. In clock 0, the memory controller releases the MA[11:0] signals and deasserts that RAS# and the WE# signals, if asserted. In clock 1, the RAS#, CAS# and WE# signals are also released. Moreover, the RAS#, CAS# and WE# signals must be pulled up, either externally or internally to one of the chips, weakly to sustain the deasserted state during turnaround. The memory controller must also ensure that other RAS# line remain deasserted.

Hence, during clock cycles 1 and following, the graphics controller has control over the memory system and transmits various signals thereto to read or write data from the frame buffer portion of the system memory. Eventually, at clock cycle 9, the graphics controller relinquishes control over the system memory by deasserting MREQ#. The memory controller takes over control of the system memory interface in clock cycle 10.

The timing shown in the figure above assumes that the DRAM controller in the graphics controller runs synchronous to the arbitration clock, and hence to the DRAM controller clock in the memory controller. Performance requirements may make it desirable for the graphics controller operate its DRAM control subsystem asynchronous to the arbitration clock. Therefore, the following absolute timing parameters are specified for the DRAM control signals.

1. The MA[11:0] and MD[63:0] signals will be released by the memory controller (graphics controller) at least 0ns before the clock edge on which MGNT# is sampled asserted by the graphics controller (MREQ# is sampled deasserted by the memory controller).

2. The CAS# and WE# signals will be driven to a deasserted state by the memory controller at least 0ns before the clock edge on which MGNT# is sampled asserted by the graphics controller. Likewise, the CAS# and WE# signals will be driven to a deasserted state by the graphics controller at least 0ns before the clock edge on which MREQ# is sampled deasserted by the memory controller.

3. RAS# will be driven deasserted at least from the rising clock edge before the clock edge on which MGNT# is sampled asserted by the graphics controller (MREQ# is sampled deasserted by the memory controller). This is to allow the new bus owner to determine how long to keep RAS# deasserted to meet RAS# precharge.

4. The RAS#, CAS# and WE# signals will be released by the memory controller (graphics controller) at most MIN(15ns, tCYC) after the clock edge on which MGNT# is sampled asserted by the graphics controller (MREQ# is sampled deasserted by the memory controller), where tCYC is the cycle time of the arbitration clock.

The timing parameters described above are illustrated in FIG. 7.

As far as performing reset functions are concerned, the following considerations apply. The graphics controller and the memory controller, in general, need not use the same reset signal. Specifically, the graphics controller will likely use the PCI reset signal, while the memory controller may not. Note that the PCI reset signal is not synchronous to the arbitration clock on either the assertion or deassertion edge of the reset signal. The following requirements must be met in order to guarantee reliability and functionality coming out of reset:

1. The arbitration clock must free run for a predetermined number of clock cycles before the deassertion of reset. The actual number of clock cycles is determined during design based upon the specific implementation.

2. The memory controller must asynchronously release all DRAM interface signals on the assertion of reset.

3. The graphics controller must asynchronously release the MD[63:0] lines on the assertion of reset.

4. The graphics controller arbiter state machines must reset to a state where MREQ# is driven deasserted, and must not sample the state of MGNT# while reset is asserted.

5. The memory controller arbiter state machines must reset to a state where MGNT# is driven deasserted.

If both the memory controller and the graphics controller adhere to the above points, the deassertion of reset need not be seen in the same arbitration clock by both parts.

It is noted that the amount of time that the arbitration clock must freerun before the deassertion of the reset must also be specified in the system as determined by specific implementation configurations.

Figure 8:
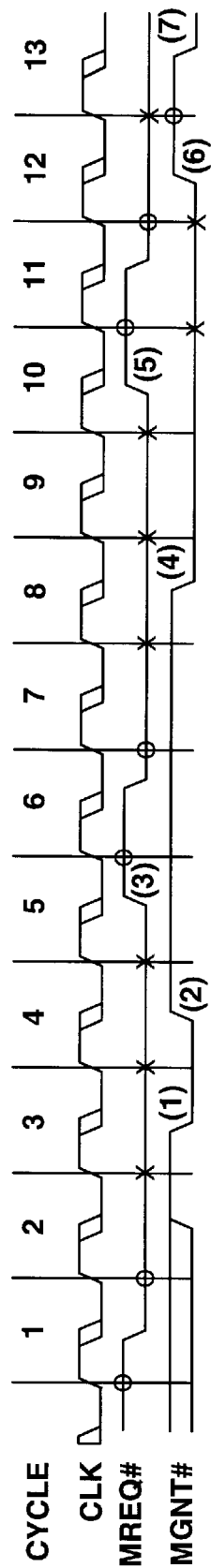
FIG. 8 is timing diagram illustrating protocol boundary conditions for a two-wire arbitration protocol performed by the system of FIG. 5.

Boundary conditions for the arbitration protocol will now be described with reference to the timing diagrams of FIG. 8. In the following, functions performed during specific clock cycles illustrated in FIG. 8 are described. In FIG. 8, the corresponding clock cycles are identified by numerals placed in parenthesis.

1. The memory controller will grant control of the DRAM interface by asserting MGNT#, in response to a transition on the MREQ# signal from the deasserted to the asserted state. This is indicated by the 'O' illustrated on the sampling points of the MREQ# signal at the beginning and end of clock 1 with FIG. 8. This indicates a low priority request. On the edge that the MGNT# signal is asserted, and for two clocks thereafter, the MREQ# signal shall not be sampled by the memory controller. This is indicated by the 'X' illustrated on the sampling points of the MREQ# signal at the beginning of clocks 3, 4 and 5 within FIG. 8. Note that the memory controller arbitration logic has the entire period of clock 2 to evaluate.

2. The memory controller may deassert the MGNT# signal after only one clock, indicating to the graphics controller that it should relinquish the DRAM interface as soon as possible. The memory controller will deassert MGNT# when it has a pending DRAM operation. Recall that the DRAM interface is not actually relinquished by the graphics controller until the graphics controller deasserts the MREQ# signal.

3. The graphics controller deasserts MREQ# at the earliest time allowed by the arbitration. The graphics controller has sampled the MGNT# signal asserted at the end of clock 3 and has the entire period of clock 4 to evaluate logic resulting in the deassertion of MREQ#. If MREQ# were raised high any earlier, the graphics controller would not know that MGNT# had been asserted and the high level on MREQ# may be interpreted by the memory controller as a high priority request. Note that this arbitration episode is intended only to illustrate the boundary conditions of the arbitration and does not represent a useful exchange; the memory controller would control the DRAM interface for only two clocks in this case.

4. Same as (1).

5. Same as (3).

6. Here the memory controller did not deassert the MGNT# signal immediately after asserting it, since there was no pending DRAM operation. The MGNT# signal is deasserted in response to the deassertion of the MREQ# signal by the graphics controller. Also note that the memory controller should not sampled the state of MGNT# on the clock edge on which it drives MREQ# asserted, or the clock after, or else it could confuse an assertion of MGNT# with an assertion due to the previous request. In this example, the earliest MGNT# should be sampled is clock 12.

7. The MGNT# signal can be reasserted after only one clock of deassertion; note that this is the same case as (1).

Figure 9:
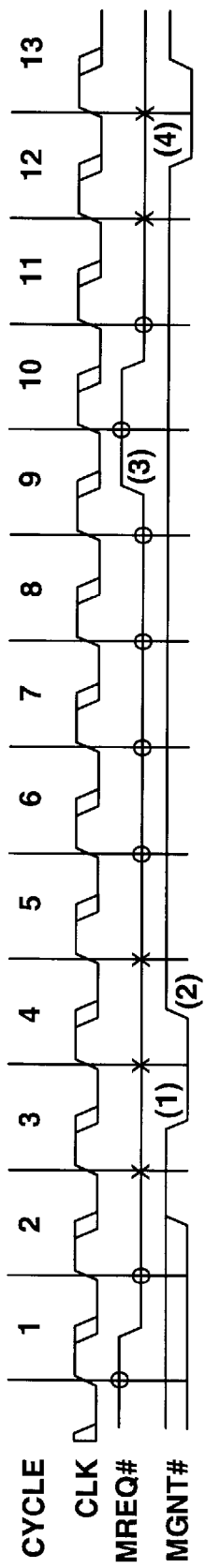
FIG. 9 is a timing diagram illustrating a method by which the graphics controller retains control over the memory after receiving a request by the memory controller to relinquish control.
Figure 10:
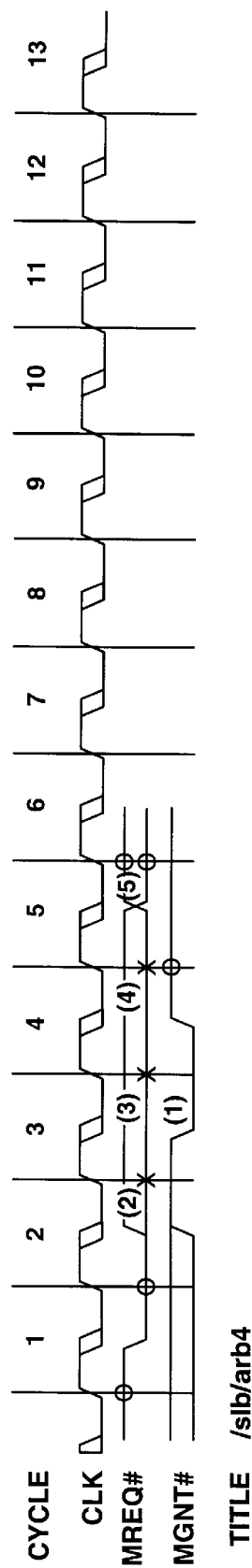
FIG. 10 is a timing diagram illustrating a method by which the graphics controller relinquishes control of the memory upon receiving a request from the memory controller.

FIG. 9 illustrates the clock request and grant signals in the circumstance where the graphics controller delays relinquishing the bus to complete a high priority graphics controller operation. The following steps are performed:

1. The memory controller asserts MGNT# after sampling a transition from deasserted to asserted on MREQ#.

2. The memory controller deasserts MGNT# due to a pending DRAM operation.

3. The graphics controller retains control of the DRAM interface until clock 9, when it is relinquished with the deassertion of MREQ#.

4. Same as (1) (Note that memory controller would probably not grant here, as this is a low priority request, and there was a pending memory controller DRAM operation back in clock 4).

FIG. 6 illustrates the clock request and grant lines in the case where the graphics controller relinquishes control promptly upon receiving a request from the arbitration unit of the memory controller. More specifically, the following steps are performed:

1. The memory controller asserts MGNT# after sampling a transition from deasserted to asserted on MREQ#.
2. The memory controller deasserts MGNT# due to a pending DRAM operation.
3. The graphics controller relinquishes the DRAM interface in response to sampling the deassertion of MGNT#, indicated by the 'O' illustrated on the sample point of MGNT# at the end of clock 4. The graphics controller has the entire period of clock 5 to evaluate the logic determining whether to relinquish the DRAM interface.

Figure 11:
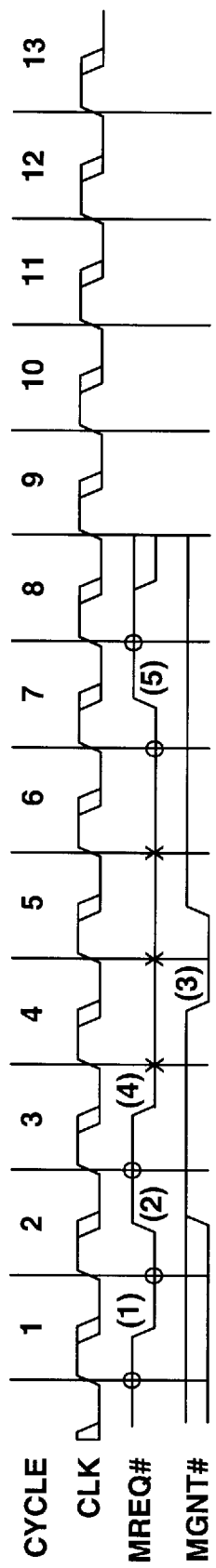
FIG. 11 is a timing diagram illustrating a method by which the graphics controller signals a high priority request.

FIG. 11 illustrates the clock request and grant signals for a case where the graphics controller signals a high priority request.

1. The graphics controller signals a low priority request by asserting the MREQ# signal.
2. The graphics controller raises the request for the DRAM interface to a high priority by raising the MREQ# signal to a high level. The graphics controller has not yet sampled MGNT# asserted.
3. The memory controller has recognized the high priority request signaled by the graphics controller, indicated by the 'O' illustrated on the sample point of the MREQ# signal at the end of clock 2.
4. The graphics controller lowers the MREQ# signal back to a low level one clock after raising it to a high level to signal a high priority request.
5. graphics controller relinquishes the DRAM control interface by deasserting MREQ#. Note difference between "deasserting" MREQ# (to relinquish DRAM control interface) and "raising MREQ# to a high level" (to signal a high priority request). These separate terms are used to underscore the difference.

Figure 12:
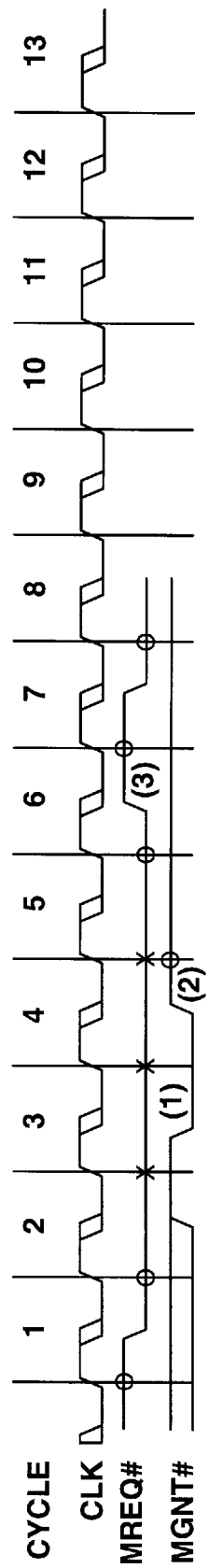
FIG. 12 is a timing diagram illustrating a method by which the graphics controller asserts a superfluous high priority memory request.

FIG. 12 illustrates a superfluous high priority request by the graphics controller. The following steps are performed:

1. The memory controller asserts MGNT# after sampling a transition from deasserted to asserted on MREQ#.
2.–4. The graphics controller could raise the MREQ# signal to a high level in any of these clocks, indicating it wishes to raise the priority of its request for control of the DRAM interface. However, the memory controller has already committed to granting the DRAM interface. Because of this commitment, the signaling of the higher priority request is superfluous: once the MGNT# signal is asserted, the priority of the original request does not matter.
5. The soonest the memory controller will resample MREQ# is at the end of clock 5. If the MREQ# is sampled asserted, the graphics controller is assumed to retain control of the DRAM interface, if sampled deasserted, the graphics controller is assumed to relinquish control.

What has been described is a computer system wherein a memory controller and a graphics controller share access to system memory such that the graphics controller may use a portion of the system memory as a frame buffer. Individual components of the invention may be configured in accordance with the variety of techniques. For example, some components may be configured in hardware, others in software, and still others in firmware. In one embodiment, the system is employed in connection with a microprocessor configured in accordance with Intel Architecture. However, many aspects of the invention may be applied to computer systems employing other microprocessor architectures as well. Also, in one embodiment, the memory controller is a Triton VX system controller provided by Intel Corporation. Principles of the invention may be applied to the systems other than microprocessor computer systems. Accordingly, the exemplary embodiments described herein have been provided solely to illustrate principles of the invention and should not be construed as limiting the scope of the invention.

What is claimed is:

1. A machine implemented prioritization method comprising the steps of:
    granting a highest priority to a graphics controller request specifying a screen refresh when a screen refresh FIFO is starved;
    granting a second highest priority to a memory controller request specifying a high priority DRAM refresh;
    granting a third highest priority a memory controller request specifying a memory access request;
    granting a fourth highest priority to a graphics controller request specifying a graphics operation other than a screen request operation when the screen refresh FIFO is starved; and
    granting a fifth highest priority to a low priority DRAM refresh and wherein the graphics controller is required to relinquish control of the memory system within a predetermined number of clock cycles following a request by the memory controller to guarantee DRAM refresh.

2. An arbitration unit comprising arbirtation logic that grants
    a highest priority to a graphics controller request specifying a screen refresh when a screen refresh FIFO is starved;
    a second highest priority to a memory controller request specifying a high priority DRAM refresh;
    a third highest priority a memory controller request specifying a memory access request;
    a fourth highest priority to a graphics controller request specifying a graphics operation other than a screen request operation when the screen refresh FIFO is starved; and
    a fifth highest priority to a low priority DRAM refresh and wherein the graphics controller is required to relinquish control of the memory system within a predetermined number of clock cycles following a request by the memory controller to guarantee DRAM refresh.

3. In a two-wire resource arbitration system having a request signal line and a grant signal line, a method for requesting for a resource, said method comprising the steps of:
    asserting a first priority request by asserting and maintaining a request signal on the request signal line, then waiting until a grant signal is returned on the grant signal line, before accessing the requested resource; and
    asserting a second priority request by asserting a request signal on the request signal line, then before receiving a return grant signal on the grant signal line, momentarily deasserting the request signal, then reasserting and maintaining the request signal on the request signal line.

4. The method of claim 3 wherein the requesting device is a graphics controller.

5. The method of claim 3 wherein the requesting device is granted control of the resource by an arbitration unit asserting a grant signal on the grant line.

6. The method of claim 5 wherein the requesting device continues to assert a request signal on the request line while maintaining control of the resource and wherein the requesting device relinquishes control of the resource by deasserting the request signal.

7. The method of claim 5 wherein the arbitration unit signals the requesting device to relinquish control of the resource by deasserting the grant signal on the grant line.

8. For use with a two-wire resource arbitration system having a request signal line and a grant signal line, an apparatus for requesting for a resource, said apparatus comprising:

means for asserting a first priority request by asserting a request signal on the request signal line, then waiting until a grant signal is returned on the grant signal line, before accessing the requested resource; and means for asserting a second priority request by momentarily asserting a request signal on the request signal line, then before receiving a return grant signal on the grant signal line, momentarily deasserting the request signal, then reasserting and maintaining the request signal on the request signal line.

9. The apparatus of claim 8 wherein the requesting device is a graphics controller.

10. The apparatus of claim 8 wherein the requesting device is granted control of the resource by an arbitration unit asserting a grant signal on the grant line.

11. The apparatus of claim 10 wherein the apparatus includes means for continuing to assert a request signal on the request signal line while maintaining control of the resource and wherein the requesting device relinquishes control of the resource by deasserting the request signal.

12. The apparatus of claim 10 wherein the arbitration unit signals the requesting device to relinquish control of the resource by deasserting the grant signal on the grant line.

13. For use in a two-wire resource arbitration system having a request signal line and a grant signal line, an apparatus for requesting for a resource, said apparatus comprising:

a first priority request unit for asserting a first priority request by asserting and maintaining a request signal on the request signal line, then waiting until a grant signal is returned, before accessing the requested resource; and a second priority request unit for asserting a second priority request by asserting a request signal on the request signal line, then before receiving a return grant signal on the grant signal line, momentarily deasserting the request signal, then reasserting and maintaing the request signal on the request signal line.

14. The apparatus of claim 13 wherein the requesting device is a graphics controller.

15. The apparatus of claim 13 wherein the requesting device is granted control of the resource by an arbitration unit asserting a grant signal on the grant line.

16. The apparatus of claim 15 wherein the apparatus includes a unit for continuing to assert a request signal on the request signal line while maintaining control of the resource and wherein the requesting device relinquishes control of the resource by deasserting the request signal.

17. The apparatus of claim 15 wherein the arbitration unit signals the requesting device to relinquish control of the resource by deasserting the grant signal on the grant line.

18. In a system for granting a resource usage request to a requesting device wherein a single line transmits usage requests and a single line transmits grant signals, a method for allowing the arbitration system to distinguish between at least two priority levels of usage requests, said method comprising the steps of:

detecting for assertion of a signal on the line for transmitting usage requests;

monitoring for a predetermined number of clock cycles for momentarily deassertion of the asserted signal; and identifying the asserted signal as a first priority request if momentarily deassertion of the signal is not detected during the predetermined number of clock cycles, and identifying the asserted signal as a second priority request if momentarily deassertion is detected during the predetermined number of clock cycles.

19. For use in an arbitration system for granting a resource usage request to a requesting device wherein a single line transmits usage requests and a single line transmits grant signals, an apparatus for allowing the arbitration system to distinguish between at least two priority levels of usage requests, said apparatus comprising:

means for detecting assertion of a signal on the line for transmitting usage requests;

means for monitoring for a predetermined number of clock cycles, momentarily deassertion of the asserted signal; and means for identifying the signal as a first priority request if momentary deassertion of the asserted signal is not detected during the predetermined number of clock cycles, and identifying the request as a second priority request if momentary deassertion of the asserted signal is detected during the predetermined number of clock cycles.

20. For use in an arbitration system for granting a resource usage request to a requesting device wherein a single line transmits usage requests and a single line transmits grant signals, an apparatus for allowing the arbitration system to distinguish between at least two priority levels of usage requests, said apparatus comprising:

a first detection unit for detecting assertion of a signal on the request line for transmitting usage requests;

a second detection unit for monitoring for a predetermined number of clock cycles deassertion of the asserted signal; and an identification unit for identifying the signal as a first priority request if momentary deassertion of the asserted signal is not detected during the predetermined number of clock cycles and identifying the request as a second priority request if momentary deassertion of the asserted signal is detected during the predetermined number of clock cycles.

21. A computer system comprising:

a processor;

a memory controller coupled to the processor;

a graphics controller;

a shared memory;

a single interface bus connecting the memory controller and the graphics controller to the shared memory; and an arbitration unit, connected to the memory controller and the graphics controller, for arbitrating usage requests to the shared memory by the memory controller and the graphics controller, said arbitration unit being connected to the graphics controller by a single grant line and a single request line, said arbitration unit distinguishing at least two priority levels of usage requests of the graphics controller based exclusively on the manner the graphics controller asserts and maintains a usage request signal on the single request line.

22. The computer system of claim 21 wherein the arbitration unit includes elements for:

detecting the assertion of a usage request signal on the request line;

monitoring for momentarily deassertion of the asserted user request signal within a predetermined number of clock cycles; and identifying the request as a first priority request if the usage request signal is not momentarily deasserted during the predetermined number of clock cycles and identifying the request as a second priority request if during the predetermined number of clock cycles the usage request signal is momentarily deasserted.

23. The computer system of claim 21 wherein the graphics controller includes elements for:

asserting a first priority request by asserting a usage request signal, then waiting until a grant signal is returned, before accessing the requested resource; and asserting a second priority request by asserting a usage request signal, then before receiving a return grant signal, momentarily deasserting the usage request signal, then reasserting and maintaining the usage request signal.

24. The computer system of claim 21 wherein the arbitration unit includes elements for implementing a prioritization protocol including elements for:

granting a highest priority to a graphics controller request specifying a screen refresh when a screen refresh FIFO is starved;

granting a second highest priority to a memory controller request specifying a high priority DRAM refresh;

granting a third highest priority to a memory controller request specifying a memory access request;

granting a fourth highest priority to a graphics controller request specifying a graphics operation other than a screen request operation when the screen refresh FIFO is starved; and granting a fifth highest priority to a first priority DRAM refresh and wherein the graphics controller is required to relinquish control of the memory system within a predetermined number of clock cycles following a request by the memory controller to guarantee DRAM refresh.

25. The computer system of claim 21 further including a system bus coupling the processor and the memory controller, a PCI bus, and at least one peripheral device connected to the graphics controller through the PCI bus.

26. The computer system of claim 21 wherein the memory controller includes a DRAM refresh unit.

27. The computer system of claim 21 wherein the graphics controller includes a drawing engine and a stack RAM FIFO.

* * * * *